United States Patent [19]

Ludloff

[11] 3,921,446

[45] Nov. 25, 1975

[54] METHOD OF MEASURING TORQUE

[76] Inventor: Karl Ludloff, 519 Midvale Ave., Los Angeles, Calif. 90024

[22] Filed: July 9, 1973

[21] Appl. No.: 377,584

Related U.S. Application Data

[63] Continuation-in-part of Ser. No. 132,007, April 7, 1971, Pat. No. 3,817,092.

[52] U.S. Cl. .................................. 73/136 R; 73/117
[51] Int. Cl.² ........................................ G01M 15/00
[58] Field of Search .......................... 73/136 R, 117

[56] References Cited
UNITED STATES PATENTS

| | | | |
|---|---|---|---|
| 3,057,192 | 10/1962 | Huffman et al. | 73/117 |
| 3,289,471 | 12/1966 | Maxwell | 73/136 R X |
| 3,554,023 | 1/1971 | Geul | 73/117 |
| 3,729,989 | 5/1973 | Little | 73/116 X |

*Primary Examiner*—Jerry W. Myracle

[57] ABSTRACT

The method for measuring torque described is based upon the fact that angular velocity $\omega$ and angular acceleration $\alpha$ are independent dynamical variables at any given time. Thus, for any given $\omega$, a simultaneous determination of $\alpha$ and $\omega$ can be utilized for a determination of power. The method of measurement requires a negligible perturbation of the rotating system. It is easily susceptible to modification over a wide range of variations. Particular reference is made to the determination of the contribution to the torque of a rotating system by a part or subsystem.

10 Claims, 4 Drawing Figures

METHOD OF MEASURING TORQUE

This is a continuation-in-part of the earlier filed parent case Ser. No. 132,007, filed Apr. 7, 1971, which is now Pat. 3,817,092, the filing date of the parent case being claimed.

BACKGROUND OF INVENTION

The present invention is directed to a new method of measuring torque, based upon the fact that part of the torque produced by a system with rotating elements (hereinafter referred to as rotating systems) must be used to overcome the inertia of said rotating elements.

In this specification reference will be made to measurements of angular acceleration $\alpha$, or of torque N, or of power P. It should be understood however that the relationships existing between these quantities, namely that torque is equal to the product of moment of inertia I and angular acceleration, $N=I\alpha$, that power is equal to the product of torque and angular velocity $\omega$, $P=N\omega$, and that the time rate of change of the square of angular velocity is proportional to power divided by moment of inertia, $d(\omega^2)/dt=2P/I$, are known in the art. Accordingly, it should be understood that angular acceleration, or torque, or power, or the time rate of change of the square of angular velocity may be used herein with the knowledge that many of the statements or relationships that bear on this invention hold equally well if one of these terms is substituted for one of the others, provided proper account is taken of the known relationships between them that are listed in this paragraph.

The difference in principle between the method for measuring power described herein and existing dynamometer measurements can be seen readily from the equation that relates the torque N on a system to the time rate of change of the angular momentum (dL/dt) of that system, i.e.

$$dL/dt = N \quad \text{(equation 1)}$$

This equation is the analogue, for a rotating system, of Newton's second law of dynamics, and is in fact derived from this law.

Existing dynamometers determine the torque produced by a contrivance by balancing it against a known external load, i.e., they determine the physical quantity represented by the right-hand side of equation given above. The method specified herein involves determining the time rate of change of the angular momentum of the rotating elements internal to the system, i.e., determining the physical quantity represented by the left-hand side of equation given above. This is done by making use of the relation between time rate of change of angular momentum, moment of inertia I, and the angular acceleration $\alpha$ (i.e., the time rate of change of angular velocity), resulting in the equation $$dL/dt = I\alpha \quad \text{(equation 2)}$$

The moment of inertia is taken to be known in either relative or absolute terms, since this is a quantity which is either previously provided for a given system, or can be determined by those working in this art. The determination of $\alpha$ [angular acceleration] is combined with the known value of I [inertia] to give $dL/dt$ and hence by equation 1, given above, the value of N to be determined.

The fundamentally new concept in the method specified herein is based upon the fact that angular velocity $\omega$ and angular acceleration $\alpha$ are independent dynamical variables at any given time. Hence, for any given $\omega$, a simultaneous determination of $\alpha$ and $\omega$ can be utilized for a determination of power. Furthermore, the method of measurement specified herein entails a negligible perturbation of the rotating system (weak-probe measurement). In contrast, although present dynamometers allow determination of $\omega$ by a weak-probe measurement, they require a strong coupling to an external system to determine torque (strong-probe measurement). For example, a tachometer measurement can presently be made during a vehicle's normal performance without affecting the value of $\omega$ being determined (weak-probe measurement). Most present methods dissipate practically the entire torque being measured (strong-probe measurement) and require taking the vehicle out of its normal mode of operation. The weak-probe method of determining torque specified herein thus leads to the first completely weak-probe dynamometer, allowing power measurements under fully dynamic conditions, and thereby opening whole new fields of application precluded with a strong-probe dynamometer, such as monitoring and control systems linked to continuous power determination in any desired mode of a vehicle's operation.

It is contemplated that various instruments will accomplish the above measurements. It is further contemplated that a single device with suitable electronic circuitry will determine both the independent variables $\omega$ and $\alpha$ and thereby power, although such a device is not necessary for the method disclosed herein.

While throughout this description examples will be cited of devices, circuits and techniques, it should be understood that these cited examples are not to be taken in a restrictive sense, but are limited in scope and in number to improve the clarity and coherence of this disclosure. The proliferations of devices, circuits, techniques, and of applications of the method and devices will be readily apparent to those skilled in the art, and they are intended to be included as a part hereof.

DESCRIPTION OF THE PREFERRED EMBODIMENTS

Figure 1:
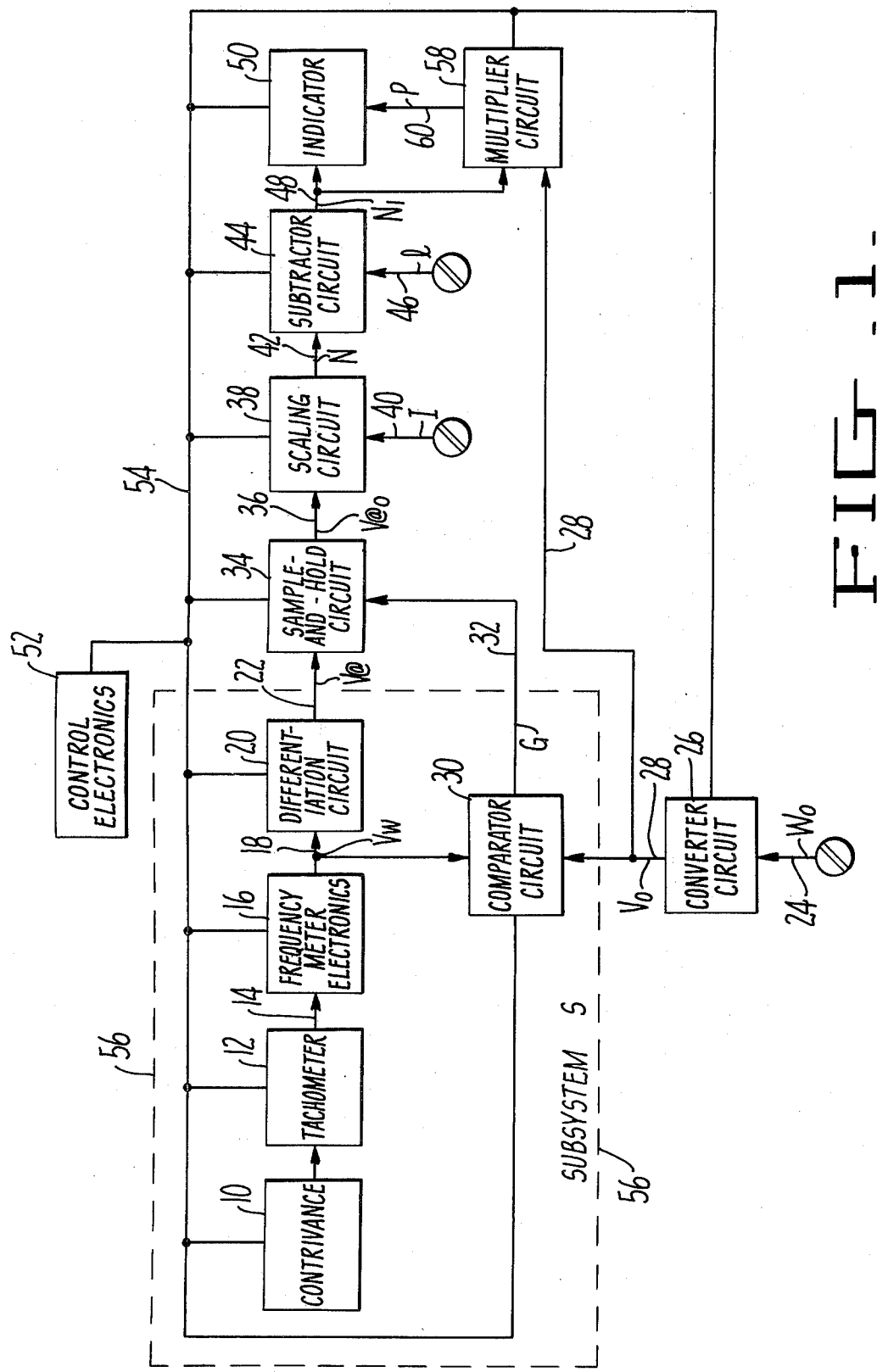
FIG. 1 is a block diagram of a torquemeter and dynamometer circuit for single point measurements.

The torquemeter illustrated in FIG. 1 includes a contrivance (a rotating system) 10 whose output torque is to be determined. For example, if the contrivance were an automobile with a rotary engine, said output could refer to the direct torque output of the engine or to the torque output at the rear wheels, said latter torque differing from said former torque by system losses.

A tachometer 12 is coupled directly by conventional means to a rotating element of said contrivance 10, and is to measure the angular velocity $\omega$ of said rotating element, a known relationship existing between the angular velocity of said rotating element and the angular velocity $\omega$ of any other rotating element of said contrivance 10 which could be used to determine the output torque of said contrivance 10.

Different methods of measuring $\omega$, $\omega^2$, and $\alpha$, or combinations thereof, are possible, such as electrical, magnetic, electronic, mechanical, electromechanical, optical and even nuclear methods. In certain cases, some of these methods may be preferable to others, for example, for reasons of accuracy, or cost, or convenience. Furthermore while the terms electrical, magnetic, electronic or electromechanical in describing a signal, circuit, device or measurement may be referred to herein, it should be understood that such terms are used in the descriptive sense to include any or all such terms when applicable.

The output 14 of said tachometer 12 is coupled by conventional means into an electronic circuit 16 that converts said output 14 into an electrical signal 18 called $V_\dot{W}$, representing the angular velocity $\omega$. The type of said electronic circuit 16 required, as described below, will depend in part upon said tachometer 12 used and the accuracy of measurement required.

Many suitable tachometers are well known to those skilled in this art and include, for example, (1) those based upon the Faraday induction effect, and (2) those from which binary outputs are obtained at fixed and known angular positions of a rotating element, as for example, from the breaker points of an automobile ignition system.

If said tachometer 12 is derived from the breaker points of a rotating engine, then said electronic circuit 16 could, by conventional means, convert the rate of breaker-point closures into an electric analog signal, said analog signal being proportional to the rate of breaker-point closures per unit time and hence proportional to the angular velocity of said breaker-point system. The lack of information concerning the state of the rotating system between breaker-point closures (usually referred to as dead time or resolution) limits the accuracy of measurements based on breaker-point systems. In actual practice dead time need not be a real limitation since the state of the art is such that angular position, or degrees, can be subdivided almost without limit down to microscopic levels, if necessary. Hence the time interval between successive binary outputs from a sufficiently sophisticated tachometer coupled to even the slowest rotating element of practical interest, can be made vanishingly small, e.g., instantaneous.

An electronic circuit 20, whose input is the electrical signal 18 $V_\dot{W}$, performs the mathematical operation of differentiation to yield as output 22 an electrical signal $V_{@}$, equal to the time rate of change of 18, $V_\dot{W}$ and representing the angular acceleration. Various known techniques are available to perform the desired operation, and a few electrical ones are given herein as illustrations.

I. Analog method: Utilizing conventional techniques, signal 18, $V_\dot{W}$ is in effect applied across the terminals of a capacitor and a measurement is made of the current flowing through said capacitor as a result of the applied voltage 18, $V_\dot{W}$, said current being directly related to the time rate of change of $V_\dot{W}$, and hence in effect, is a measure of output 22, $V_{@}$.

II. Digital method: $V_\dot{W}(t)$ and $V_\dot{W}(t+Dt)$ are measured, where $Dt$ is a known time interval and is smaller than any time interval of practical interest but large enough to achieve simplicity of electronic design. These two signals and $Dt$ are combined utilizing conventional digital techniques to compute the desired result, $$V_{@} \approx [V_\dot{W}(t+Dt) - V_\dot{W}(t)]/Dt.$$

III. Instantaneous method: It is to be distinguished at this point in the description between determination of the instantaneous and the average angular acceleration $\alpha$, exemplified by the analog and digital methods just referred to. The analog method is instantaneous since a continuous relationship exists between $V_\dot{W}$, representing $\omega$, and $V_{@}$, representing $\alpha$. The digital method, on the other hand, requires two successive measurements for the determination of $V_{@}$, and hence is not instantaneous, although in the limit of a vanishingly small $Dt$ it becomes instantaneous. We note further that in the analog method, as applied to a breaker-point type of tachometer, for example, although the determination of $V_{@}$ is instantaneous, that of $V_\dot{W}$ becomes instantaneous only in the limiting case of a vanishingly small dead time.

A selected value 24 of $\omega$, called $\omega_o$, is converted by electronic circuit 26 into the electrical signal 28, $V_o$. This can be acomplished by conventional means, for example, by a potentiometer mounted on the dashboard of an automobile or coupled to the throttle of an automobile or of a boat. The electronic circuit 30 compares the two signals 18, $V_\dot{W}$ and 28, $V_o$ and, if the circuit 30 is in the enabled or ready-to-function state, it gives as an output the signal 32, G at the time when 18, $V_\dot{W}$ passes through the value of 28, $V_o$. The circuit 30 includes means for being enabled and can include means for being disabled automatically after the signal 32, G of on command from some other source. Signal 32, G also indicates whether 18, $V_\dot{W}$ is increasing or decreasing when it passes through the value of 28, $V_o$, although this information can be incorporated into the enabling circuitry. The techniques for realizing these functions are all well known in this art. On command from signal 32, G, the electronic circuit 34, by conventional means, causes the value of 22, $V_{@}$ at that time to be stored. This particular value of 22, $V_{@}$ is called 36, $V_{@o}$ and represents $\alpha$ at the time when $\omega$ equals $\omega_o$. The electronic circuit 38 functions to account for the known moment of inertia 40, I of the system by providing for the multiplication of said signal 36, $V_{@o}$ by said input I, 40, the result of said multiplication becoming the output signal 42 from circuit 38, called N, and representing the uncorrected value of torque measured at $\omega$ equal to $\omega_o$. While the positioning of electronic circuit 38 is placed after circuit 34 as shown, it should be understood that said circuit 38 could have equally well, or even more simply, been positioned elsewhere, as will be readily apparent. The optional electronic circuit 44 modifies the signal 42, N to compensate for external load losses and for internal system losses, said losses called l, 46, in a manner discussed in more detail in connection with FIG. 2, said modified signal 48, $N_1$ representing the corrected value of torque to be determined. The indicator 50 functions to display or record said value of torque $N_1$, 48 to be determined. This indicator 50 could consist, for example, of a simple panel meter, a recording device or a digital readout device and is optional.

Electronic control circuitry 52 with interconnecting signal control paths 54, as required, is utilized to reset circuits to a prescribed state, to enable circuits as necessary, as for example the comparator circuit 30 or a tape readout device, to reset and disable appropriate circuits when their respective functions have been fulfilled, and to perform other such conventional functions.

The subsystem of elements 10 through 22, 28, 30, 32 and 54 in FIG. 1, which are described above, form a subsystem which will hereinafter be referred to as Subsystem S, 56, and indicated generally by the broken lines.

The torquemeter described above is combined with the electronic circuit 58 to form the dynamometer illustrated in FIG. 1. The circuit 58 mixes the signal 28, $V_o$ with the signal 48, $N_1$ to yield the output signal P, 60, representing the power set out to be determined.

The torquemeter and dynamometer illustrated in FIG. 1 are significant in that they take single-point measurements, and in that the moment of inertia I, 40 and the external load losses and the internal system losses 1, 46 could be considered constant over the measurement range of $\omega_o$, 24. In many cases of interest, as for example a motor in motion, load conditions will vary, necessitating additional measurements. Next is considered how the effect of slowly varying or fixed unknown loads can be eliminated to yield the desired measurements, as is the case with the example of torquemeter and dynamometer illustrated in FIG. 2. By slowly varying is meant sufficiently slowly varying to be considered constant over the duration of the measurement.

In practice, different models, varying amongst other things in their electronics, will be required for different applications. It is convenient to distinguish in particular two cases, one where the rotating system to be tested is housed in a stationary situation, and one where the rotating system is, for example, housed in a moving vehicle. The latter example also illustrates the case where the load varies, due to varying road conditions. The method is illustrated by considering how the effect of the varying and unknown load can be eliminated to yield the desired power measurement.

Introduce the following notation:

$N_A$ = torque produced by the engine
$N_B$ = torque associated with internal friction.
$N_C$ = torque associated with external physical quantities, such as gravity, road friction, etc.
$I_a$ = moment of inertia of engine system
$I_b$ = moment of inertia of rear-wheel system
$\omega_a$ = angular velocity of engine
$\omega_b$ = angular velocity of rear-wheel system (assuming rear-wheel drive)

The quantity $N_B$ will tend to diminish the useful effect of $N_A$; $N_C$ can act either to diminish it, e.g., by road friction and gravity acting on a vehicle moving uphill, or to enhance it, e.g., by gravity acting on a vehicle moving downhill. The sign convention chosen for these quantities is apparent from equation 5.

This then results in the basic equation set forth at the commencement of the description:

| rate of change of angular momentum of engine and rear-wheel systems | = | torque produced by engine | − | torque associated with internal friction | − | torque associated with external quantities |
|---|---|---|---|---|---|---| or, by the equation, $$\sqrt{K}\, I_a\, \alpha_a + I_b\, \alpha_b = N_A - N_B - N_C \qquad \text{(equation 5)}$$

Since we consider a vehicle in gear, the angular velocities of engine and rear-wheel systems and their time rates of change are related to each other, a relation which we express by the equations $$\omega_a = \sqrt{K}\, \omega_b$$
$$\alpha_a = \sqrt{K}\, \alpha_b \qquad \text{(equation 6)}$$

here K is a known number, which however depends on the gear the vehicle is in and the make and model of the vehicle.

Using equation 6 we can now eliminate one of two related quantities; say $\alpha_a$, from equation 5 to give $$(KI_a + I_b)\, \alpha_b = N_A - N_B - N_C \qquad \text{(equation 7)}$$

Under steady-state conditions, i.e., when the vehicle is not accelerating, we have $\alpha_b = 0$, and hence $N_A = N_B + N_C$, i.e.,

| torque produced by engine | = | torque associated with internal friction | + | torque associated with external quantities |
|---|---|---|---|---|

To measure by this method the torque produced by the engine, the measurement is made while the vehicle is accelerating (or decelerating), however slightly. To eliminate the effect of the varying and unknown load, two sets of measurements will need to be made as follows:

MEASUREMENT 1: Fuel Consumption greater than at idling

These are the conditions under which the torque $N_{A1}$ produced by the engine is to be determined. From equation 7 there is:

$$\alpha_{b1} = (N_{A1} - N_B - N_C)/(KI_a + I_b)$$

MEASUREMENT 2: Fuel Consumption at idling

This measurement is made under operating conditions by taking the foot off the accelerator while leaving the vehicle in gear. Under these conditions the torque produced by the engine is known and approximately equal to zero, $$N_A = N_{A2} \cong 0$$

We have from equation 7

$$\alpha_{b2} = (N_{A2} - N_B - N_C)/(KI_a + I_b)$$

Combining equations 8 and 9 the frictional torques are eliminated to obtain:

$$\alpha_{b2} - \alpha_{b1} = (N_{A2} - N_{A1})/(KI_a + I_b)$$

or $$N_{A2} = N_{A1} + (KI_a + I_b) \cdot (\alpha_{b2} - \alpha_{b1}) \qquad \text{(equation 11)}$$

The last equation gives the torque to be determined in terms of the known torque produced while idling, the known parameters (K, $I_a$, $I_b$) of the vehicle under the given operating conditions, and the two measured time rates of change of the angular velocities. This torque measurement combined with the measurement of the angular velocity will give the required power.

It has been tacitly assumed in the above example that the load and the internal friction do not change specifically between the two measurements. This restriction need not apply in general, as discussed below.

Figure 2:
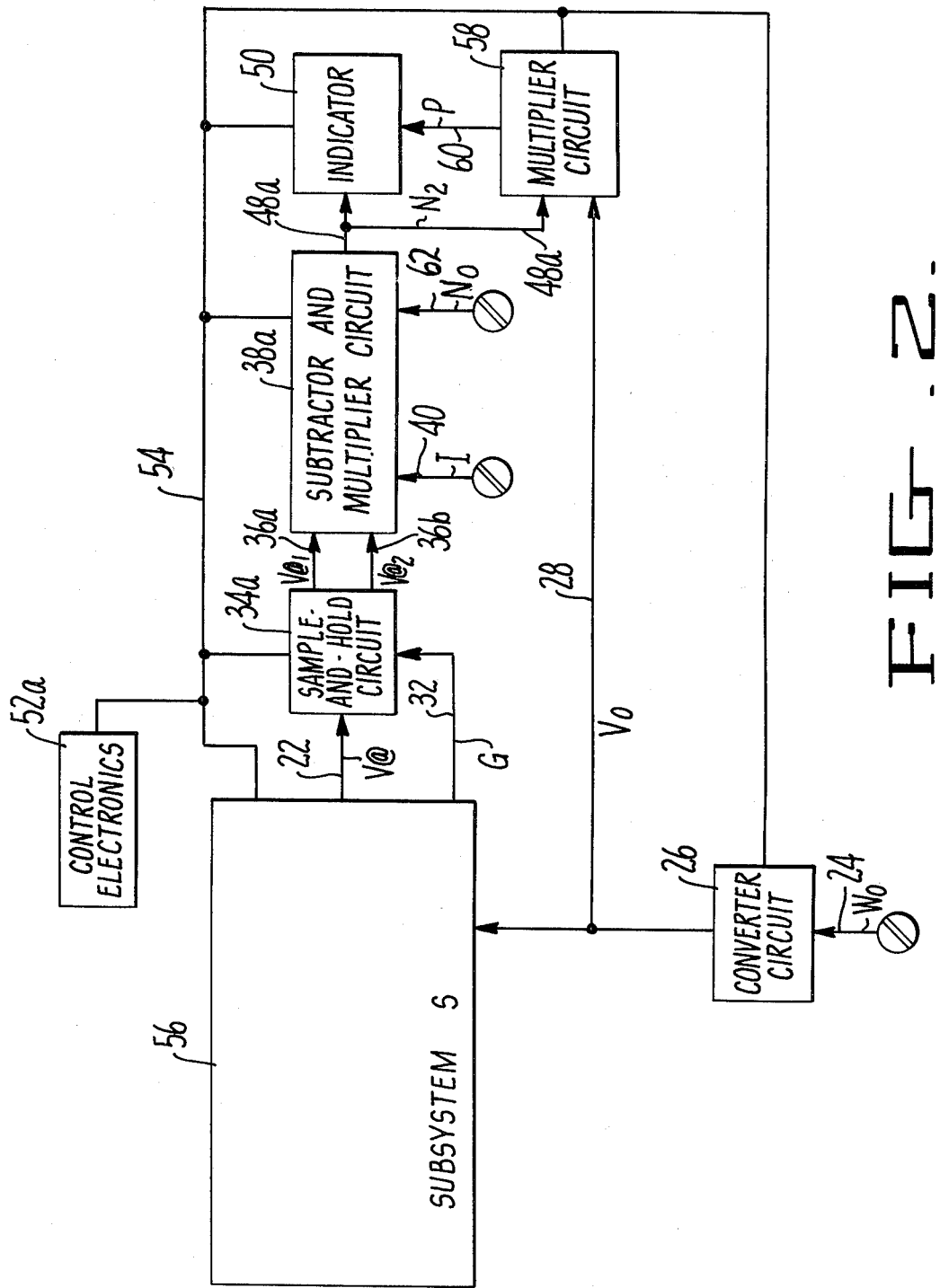
FIG. 2 is a block diagram of a torquemeter and a dynamometer circuit using some of the elements of FIG. 1, showing the method of eliminating the effect of slowly varying or fixed unknown loads.

Referring now more particularly to FIG. 2, to make these measurements, the selected value $\omega_o$, 24 is converted into electrical signal $V_o$, 28, as before and fed into Subsystem S, 56. An expanded sample-and-hold circuit 34a now stores the value of $\alpha$ corresponding to the condition in which $\omega$ is increasing through $\omega_o$, called $V_{@1}$, 36a, and to the condition in which $\omega$ is decreasing through $\omega_o$, called $V_{@2}$, 36b, on command from signal G, 32, but with an expanded control electronics 52a, which must now enable and disable the comparator circuit 30 in a different manner and which must allow for the storage control for two storage elements. The new electronic circuit 38a must now take the difference between signals 36a and 36b before compensating for the known value of I, 40, for the rotating system. This is accomplished by conventional techniques. In addition, although input 1, 46 is no longer required, an optional input 62, $N_o$ allows for the correction to the torque for the torque contribution when the system is in the quiescent state (for example, idling) should such a correction be necessary. The corrected value of torque to be determined is now called $N_2$, 48a. Circuit 58 combines signals 28 and 48a to yield the value of power 60 to be determined.

Figure 3:
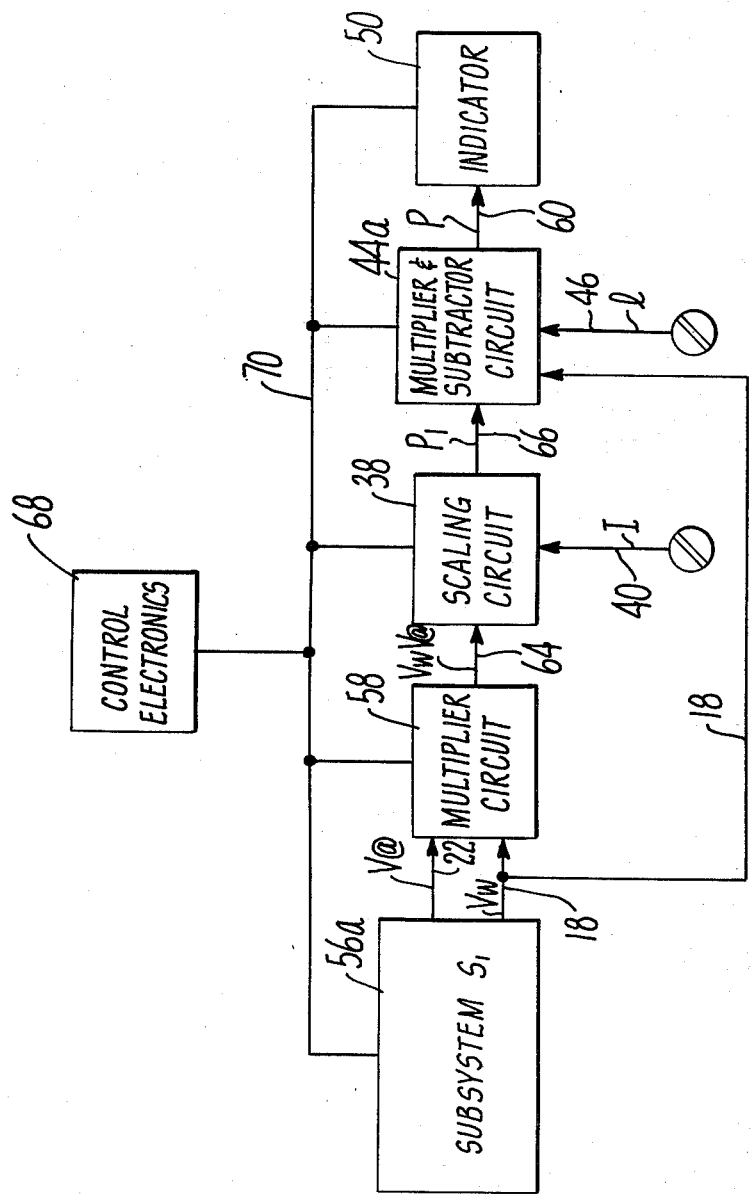
FIG. 3 is a block diagram for a continuous reading dynamometer.

A further example of the method of this invention is illustrated in FIG. 3 showing an example of a continuous reading dynamometer. A device of this method has wide application in many types of monitoring and control systems where a continuous determination of power is required. For simplicity, there is considered the situation where the losses can be constant or slowly varying as described in connection with FIG. 1, although this is not a necessary requirement of a continuous reading dynamometer.

The dynamometer of FIG. 1 can be easily converted to a continuous reading dynamometer, shown in FIG. 3. The subsystem of elements 10 through 22 in FIG. 1, which are described above, form a subsystem which will herein be referred to as Subsystem $S_1$, 56a. Its outputs are 22, $V_@$ and 18, $V_W$. The circuit 58 mixes the signal 18, $V_W$ with the signal 22, $V_@$ to yield the output signal 64, $V_W V_@$, equal to the product of 18 and 22. Electronic circuit 38 functions to account for the known moment of inertia 40, I of the system to yield an uncorrected power 66, $P_1$. Electronic circuit 44a functions to compensate for system losses 46, l to yield the corrected value of power 60, P to be determined. Indicator circuit 50 functions to display or record said value of P, 60 to be determined. Again, an optional electronic circuit 68 can be utilized to perform any necessary conventional tasks, such as resetting a circuit, via control lines 70.

Such a continuous dynamometer would, for example, play a crucial, perhaps decisive, role in under-the-hood monitoring and control systems for automobiles, whose adoption appears to be forced by the kind of stringent pollution-control and safety requirements that have already been enacted in part. To ensure less exhaust pollution, for example, involves more efficient operation of the motors, which in turn requires monitoring a number of performance characteristics, amongst which power is one of the most crucial, during the vehicle's normal operating conditions. A weak-probe compact dynamometer, such as the one described herein, is essential for this purpose. The control system would then correlate quantities such as engine temperature, engine speed and power to regulate other performance characteristics, such as the fuel-injection mixture and ignition timing.

The specific example of this method, cited above, of the determination by a single subtraction of the engine torque $N_A$ is only a special case of the method of this invention. More generally, this method allows for individual torque determinations in systems with multiple torques acting collectively and varying independently. These torques may not be determinable without performing combinations of measurements more general than the single subtraction cited above.

Subsystem torque, where subsystem refers to any part of a rotating system, can be determined if the relation for system torque is known in terms of subsystem torques (the subsystems are correlated) and provided that at least as many independent measurements are combined according to said relation as there are subsystem torques to be determined. The relation might take the form of simultaneous equations in several unknowns, necessitating at least an equal number of independent angular-acceleration measurements. In general, independent angular-acceleration measurements are made under measurably different operating conditions of said system. The specific operating conditions under which a measurement or a set of independent measurements is made is not necessarily unique but can vary according to design to facilitate a particular torque determination, as will readily become apparent from the following examples.

The subsystem torques may involve energy sources (as for example, part of a complex engine), energy sinks (as for example, a particular brake subsystem), and energy stores which can act either as energy sources or sinks depending on whether the energy level of the store is being decreased or increased (as for example, with a vehicle going downhill or uphill, respectively). In dealing with torques arising from energy sources, energy sinks or energy stores, or in dealing collectively with any combination thereof, reference will be made in this specification to acting torques or to torques acting on a rotating system or subsystem thereof.

As an illustration consider a standard-transmission four-wheel vehicle, similar to the previous example, with a tachometer coupled to the engine. In this example of more general combinations, a sequence of single subtractions is combined to separate torques and to determine the system moment of inertia.

With the vehicle in neutral gear, two independent angular-acceleration measurements are combined, as above, but in this case to determine separately the engine torque $N_A$ and the engine frictional losses $N_B$. The two measurements are obtained at a particular $\omega$, $\alpha_1$ being measured at maximum throttle depression (maximum torque), and $\alpha_2$ measured at zero throttle depression. From the set of two equations $$I_a \alpha_1 = N_A - N_B \qquad \text{(equation 12)}$$

and $$I_a \alpha_2 = - N_B \qquad \text{(equation 13)}$$

$N_A$ and $N_B$ are each determined. Additionally, measurements $\alpha_1$ and $\alpha_2$ could be repeated over a range of $\omega$ and the results stored for further use.

Next the vehicle is operated in its normal mode of operation. For purposes of simplicity the vehicle is taken to be operating on a level road so that gravitational effects can be neglected. The translational motion of the mass of the vehicle, its passengers and other load, as well as the moments of inertia of the wheels, are coupled to the rotating system through the vehicle transmission to result in an effective moment of inertia $I'$ for the system. The coupling is provided by the linkage between the wheels and the road (assuming negligible slippage between the wheels and the road) and is characterized by the factor K, as before. Similarly other inertial elements are coupled to the rotating system through their known characteristic factors.

A maximum-acceleration measurement $\alpha_3$ and a zero-throttle (idling) measurement of angular acceleration $\alpha_4$ are made with the vehicle in its normal mode of operation, again at said $\omega$, to yield $$I'\alpha_3 = N_A - N_B - N_C \quad \text{(equation 14)}$$

and $$I'\alpha_4 = -N_B - N_C, \quad \text{(equation 15)}$$

Equations 14 and 15 are combined with the now known value of $N_A$ to yield a determination $I'$, $$I' = N_A/(\alpha_3 - \alpha_4) \quad \text{(equation 16)}$$

The redetermination of $I'$ may be necessary if $I'$ changes or is allowed to vary during a period of time over which torque determinations are of interest, as for example with a truck loading or unloading freight or in a continuously operating control system. Alternatively $I'$ can be determined by changing the moment of inertia by a known amount in one of two $\alpha_4$ measurements, for example, and combining the results, rather than changing torque by a known amount. Accuracy requirements on the determination of $I'$ might also require averaging, by state-of-the-art techniques, the results of a set of angular-acceleration measurements for the determination of $I'$. Should systematic and/or random fluctuations (noise) be sufficiently large as to necessitate averaging, an improvement in signal-to-noise ratio by a factor approaching $\sqrt{n}$ can be expected by employing signal-averaging techniques, where $n$ is the number of angular-acceleration measurements so averaged. The factor $\sqrt{n}$ applies to purely random fluctuations which are inherent in every real physical system.

Finally, Equation 15 is used for the determination of $N_C$ in terms of the known parameters $I'$, $\alpha_4$, and $N_B$, $$N_C = -I'\alpha_4 - N_B \quad \text{(equation 17)}$$

As before, $N_C$ can also be determined over a range of $\omega$ and the results stored for further use, although $N_C$ is subject to change with road and climatic conditions (wind for example) necessitating redetermination of the value of $N_C$ as necessary. The possibility of identifying the energy storage aspect of $N_C$ due to gravity by repeating two $\alpha_4$ measurements going first up and then down the same constant or slowly varying grade to allow the gravitational part of $N_C$ to be isolated and determined should also be noted. Alternately, for example, sensors having output signals related to and quantitatively identifying the spatial plane of reference of the vehicle can be utilized to correct $N_C$ by conventional means for the plane of the vehicle relative to a level road.

Next is considered how the method of this invention can be applied to monitor the condition of a dual braking system of a vehicle. This example illustrates combinations of measurements made and correlated in some programmed sequence.

Consider front and rear wheel brakes to be applied independently. In this illustration, when the brakes are applied, a programmer will go through the following sequence of angular-acceleration measurements: (1) apply rear-wheel brakes (RWB) and measure $\alpha_5$; (2) remove brakes and measure $\alpha_4$, as before; (3) apply front-wheel brakes (FWB) and measure $\alpha_6$; and (4) apply brakes to all four wheels and measure $\alpha_7$. For practical reasons and assuming a rapidly responding brake system, the time required to sequence through the four program steps is assumed to be short compared to the stopping time of the vehicle, and the load is assumed not to change specifically between the four program steps. Again negligible slippage between the wheels and the road is assumed. The value of $(N_C + N_B)$ is updated through measurement (2) of $\alpha_4$. The other three measurements, suitably combined, yield $$I'\alpha_5 = -N_B - N_C - N_{RWB},$$

and therefore $$I'(\alpha_5 - \alpha_4) = -N_{RWB} \quad \text{(equation 17)}$$

similarly $$I'(\alpha_6 - \alpha_4) = -N_{FWB} \quad \text{(equation 18)}$$

and $$I'(\alpha_7 - \alpha_4) = -N_{RWB} - N_{FWB} \quad \text{(equation 19)}$$

The determinations of $N_{RWB}$ and $N_{FWB}$ serve as a measure of the condition of the front and rear wheel brake systems. Assuming all brakes to be initially in good operating condition, a variation in any of the brakes would appear as a variation in one of these two torque determinations, whereas variations in both torque determinations would more likely be indicative of some other systematic variation in the system. Measurement (4) of $\alpha_7$ can be used either as a consistency check or to correlate variations in the braking system under the three measureably different operating conditions (1), (3), and (4) of this sequence.

In the above illustration, a constant torque was assumed over a complete wheel revolution for each wheel. Eccentricities in any of the wheel-brake combinations, however, could result in different values for acting torque at different wheel positions under otherwise identical operating conditions. Angular-acceleration measurements made during only small portions of a complete wheel revolution would then result in different torque determinations, depending upon which wheel portion happened to coincide with a particular measurement. A more representative value for acting torque is obtained by making a plurality of angular-acceleration measurements at random angular positions (degrees) under otherwise identical operating conditions and averaging the results by conventional means.

More generally, consider any rotating system or subsystem thereof in which the torque acting on the system, determinable by the method of this invention, varies as a function of angular position $\phi$ of a rotating element. A representative value for acting torque can be obtained by averaging, as above. Alternatively, by correlating torque determinations with angular position of a rotating element instead of averaging, with other relevant system parameters either fixed or slowly varying, a torque-vs-$\phi$ profile of a rotating system or any subsystem thereof is obtained. This example involves a set of torque determinations correlated with the value of a particular system parameter. The inertial properties of the system must remain substantially constant over the range of $\phi$ of said rotating element, or the moment of inertia must be known in terms of $\phi$. Angular position is specifically taken as the angle between a fixed direction in the non-rotating frame of reference and a fixed direction in the rotating element. The tachometer employed for torque-vs-$\phi$ profile determination can provide information concerning the angular position and the direction of rotation of said rotating element as well as information concerning $\omega$. This information concerning $\phi$ will in general identify one or more reference (synchronizing) points on the rotating element as well as fixed angular increments thereon. Such tachometers are known to those skilled in the art and are herein also referred to as encoders. Once such a torque-vs-$\phi$ profile determination is made, the result can be stored and the information used, for example, to simplify subsequent torque determinations or combinations thereof.

In general, by torque profile in this specification is meant torque as a function of relevant system parameters, such as temperature and/or pressure, for example. The inertial properties of said system must either be fixed or slowly varying as a function of said system parameters, or the moment of inertia must be known in terms of said system parameters so that the correct value of said moment of inertia can be used in each said torque determination.

As a final example consider a standard eight-cylinder four-cycle internal-combustion gasoline engine. This is an example of a system consisting of many correlated subsystems with a known functional relation between their torques involving time or angle or temperature for example. Specifically, the torque divided by its maximum value is taken to be a known function of the angular position $\phi$ of the crankshaft of the engine for a particular set of operating conditions. Individual torque contributions can then be determined by suitable combinations of independent angular-acceleration measurements even though the torque contributions from more than one cylinder in general overlap in time.

The functional dependence of the normalized torque is taken to be the same for each of the cylinder subsystems and is denoted by $n(\phi)$, with $n(\phi)_{maximum} = 1$. The maximum (peak) value of the torque for cylinder subsystem $j$ is denoted by $N_j$. The torque-vs-$\phi$ profile for cylinder $j$ is then given by $N_j \cdot n(\phi)$. For simplicity, $N_j \cdot n(\phi)$ is assumed to be independent of angular velocity, temperature, and other relevant parameters. Also for simplicity, torques other than those produced by burning (firing) the compressed air-fuel charge in each cylinder during their respective power strokes of the operating cycle of the engine are neglected. This might include, for example, torques required to compress the air-fuel charge during the compression strokes of the cylinders, torques required to lift valves, torsional vibrations and/or coupling-related mechanical reflections (impedance-related reflections), and other miscellaneous torques which may vary over the operating cycle. These are assumed to be constant and included in $N_B$ as described before. It should also be noted that torsional vibrations, for example, are time dependent in addition to being spatially ($\phi$) dependent, so that their mathematical relation to system torque would comprise time dependence as well as $\phi$ dependence.

The operating cycle of the four-cycle engine covers two revolutions (720°) of the crankshaft. Each power stroke of a particular cylinder occupies approximately 180° (dependent upon the precise firing time of the spark plugs), and sequentially-firing cylinders have their power strokes staggered by 720/8 or 90° of crankshaft rotation. For simplicity $n(\phi)$ is taken to rise from zero at the beginning of a particular power stroke to some peak value $N_j$ and then to fall back to zero during the remaining 180° of the power stroke with a known functional dependence of $n(\phi)$ on $\phi$, and with $n(\phi)$ remaining zero during the subsequent 540° of crankshaft rotation. The time dependence of $n(\phi)$ is not made explicit.

The following notation is introduced:
$n(\phi) = \phi$ dependence of normalized torque of each cylinder
$N_{j-1}$ = peak torque of cylinder firing immediately prior to cylinder $j$
$N_j$ = peak torque of cylinder $j$
$\phi_o$ = constant angle that parametrizes the displacement of the value of $n(\phi)$ for any one cylinder relative to that of any other (90° in this example)

$$N_A(\phi) = \sum_{i=1}^{8} N_i \cdot (\phi + i\phi_o),$$

the composite torque-vs-$\phi$ profile of the engine.

The time dependence of $N_A(\phi)$ arises both from the implicit dependence of $\phi$ on time and from the dependence of $N_A(\phi)$ on the parameter $\phi_o$. Measurements are made at specific values of $\phi$ and a particular values of $\omega$. When these requirements are mutually exclusive, two measurements can be taken, for example, at a particular $\phi$ close to a particular $\omega$, one slightly above and one slightly below the particular $\omega$ and the two measurements averaged, or a measurement can be made at said particular $\omega$ in the vicinity of said particular $\phi$ and the torque corrected, by conventional means, to the particular value of $\phi$ using the known $\phi$ dependence, $n(\phi)$.

In order to determine $N_j$ for each of the cylinders it is first necessary to determine $I'$, $N_B$, and $N_C$, as described before for a system comprising a vehicle in its normal mode of operation. Independent $\alpha_3$ angular-acceleration measurements as in Equation 14 are then made at specific values of $\phi$, all at the same value of $\omega$ and near the peak value of torque for each cylinder $N_j$ (during the first half of the power stroke of cylinder $j$, for example) to allow determination of the separate torques $N_j$ for each cylinder. Such a measurement made during the power stroke of cylinder $j$ will result in torque contributions from different cylinders with at least two torques varying simultaneously, in this case torque contributions from cylinders $j$ and $j$-1. Combinations of these measurements, as prescribed by the solution of the equations relating the torques, will lead to a determination of a particular torque. In this case then, and assuming $I'$, $N_B$, and $N_C$ already determined, at least 8 independent angular-acceleration measurements, as described above, are needed to allow the separate torques $N_j$ to be determined.

Alternatively, if the value of $N_j$ is desired for only one particular cylinder, two additional independent measurements can be made during a small portion of crankshaft rotation, during the first half of the power stroke of cylinder $j$, as before for example, at any two known positions $\phi_f$ and $\phi_g$, say, where only the same two cylinders contribute engine torque. These $\alpha_3$-type measurements provide two independent but correlated data for $N_j$ and $N_{j-1}$ in terms of known quantities, as characterized by the following two equations:

$$I'\alpha_{3f} = N_{j-1} \cdot n(\phi_f - \phi_o) + N_j \cdot n(\phi_f) - N_B - N_C \quad \text{(equation 20)}$$

and $$I'\alpha_{3g} = N_{j-1} \cdot n(\phi_g - \phi_o) + N_j \cdot n(\phi_g) - N_B - N_C. \quad \text{(equation 21)}$$

Combining Equations 20 and 21 with Equation 15 results in the determination of $N_j$ in terms of the known normalized $\phi$ dependence, the known $I'$, and the independent $\alpha$ measurements, $$N_j = \frac{I'[n(\Phi_g - \Phi_o) \cdot (\alpha_{3f} - \alpha_4) - n(\Phi_f - \Phi_o) \cdot (\alpha_{3g} - \alpha_4)]}{[n(\Phi_f) \cdot n(\Phi_g - \Phi_o) - n(\Phi_g) \cdot n(\Phi_f - \Phi_o)]} \quad \text{(equation 22)}$$

The solution for $N_j$, Equation 22, provides the sequence of method steps that can be incorporated into electronic circuits to provide a determination of $N_j$ directly from the measurements $\alpha_4$, $\alpha_{3f}$, and $\alpha_{3g}$.

It should be noted also that a third independent $\alpha_3$-type measurement, $\alpha_{3h}$ say, at a value $\phi_h$ between $\phi_f$ and $\phi_g$ can be used to obtain an expression for the loss and load torques independent of $\alpha_4$, as follows:

$$N_B + N_C = N_{j-1} \cdot n(\phi_h - \phi_o) + N_j \cdot n(\phi_h) - I'\alpha_{3h} \quad \text{(equation 23)}$$

Equation 23 can be combined with Equations 20 and 21 to obtain an expression for $N_j$ similar to Equation 22 but without the necessity of the $\alpha_4$-type idling measurement. This technique could be significant in applications of the method to systems operating at a nominally constant $\omega$ and with subsystem torque contributions which overlap in time.

Figure 4:
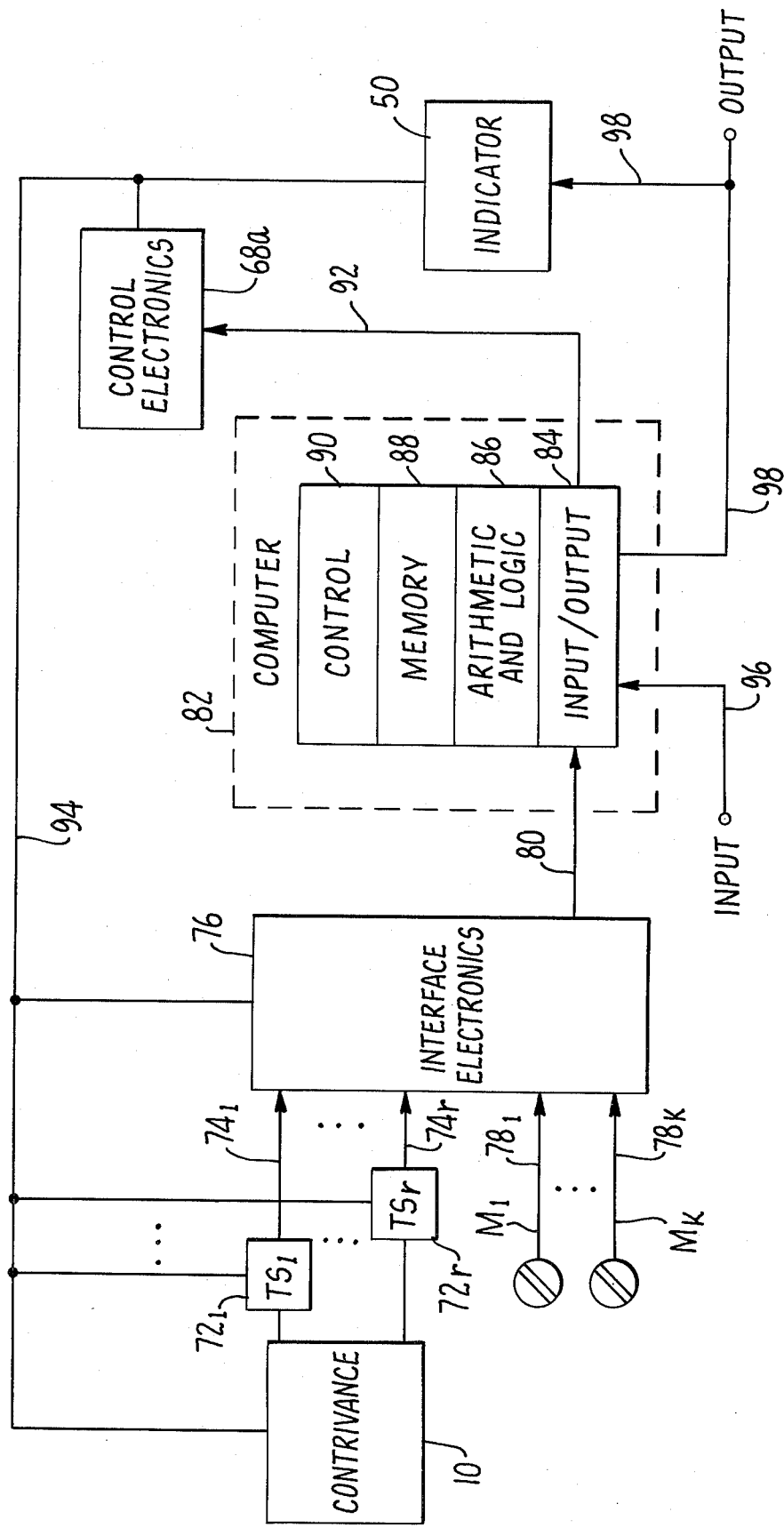
FIG. 4 is a block diagram of a general purpose torquemeter/dynamometer.

FIG. 4 illustrates a configuration for a general purpose torquemeter/dynamometer suitable, for example, for rotating systems requiring combinations of measurements more general than a single subtraction for torque and/or power determinations. Sensors $TS_1$, $72_1$ through $TS_r$, $72_r$, where $r$ is a positive integer, are coupled to or associated with contrivance 10 by conventional means. These sensors replace the simple tachometer 12 of FIGS. 1, 2, and 3. They could comprise, for example, tachometers 12, encoders, a throttle-position sensor, engine and air thermometers, and a brake-fluid pressure sensor, and are to sense relevant system operating parameters. The signals from said sensors $TS_1$, $72_1$ through $TS_r$, $72_r$ are coupled via signal paths $74_1$ through $74_r$, respectively, to interface electronics 76 which functions to convert said signals 74 to a convenient form to feed via lines 80 to the input/output section 84 of general purpose computer 82. Manual inputs $M_1$, $78_1$ through $M_k$, $78_k$, where $k$ is also a positive integer, are analogous to $\omega_o$, 24 and I, 40 in FIG. 2 and are also fed to interface electronics 76.

General purpose computer 82 is comprised of 4 interconnected sections, an input/output section 84, an arithmetic and logic section 86, a memory section 88, and a control section 90, and is conventional. Control section 90 is for internal control of computer 82. Control electronics 68a performs any necessary tasks via lines 94, as before, with part of its input from computer 82 via lines 92. It could be used to control the brakes of a vehicle in some automatic sequence provided by computer 82, for example. General purpose computer 82 serves to replace circuits 20, 30, 34, 38, 44, and 58 of the dynamometer of FIG. 1 and is included for simplicity of discussion in this general form. It lends itself to the realization of any of the types of torque determinations discussed herein involving more general combinations of independent measurements than a single subtraction. A particular application of the method could lead to a simpler and more specific realization of the electronics. Known functional relations involving relevant system parameters as well as a program describing the method steps necessary for a particular torque determination are fed into computer 82 via input 96. Any system control is implemented by control electronics 68a via lines 94, as noted. Indicator 50 functions as before and is fed from computer output lines 98.

Consider the eight-cylinder engine as a specific example of a system coupled to this general purpose torquemeter/dynamometer. Contrivance 10 includes the operating vehicle. $TS_1$, $72_1$ is a tachometer 12 coupled to the distributor of the engine. Signal $74_1$ is used only as a synchronizing signal to indicate the beginning of an engine operating cycle. In this case $r$ equals 2 and $TS_2$, $72_2$ will also be a tachometer 12 coupled to the crankshaft of the engine and yielding binary outputs $74_2$ at angular increments of 1/1000 of a crankshaft revolution, say. The output $74_2$ is converted to standard pulses in interface electronics 76 and is fed along with signal $74_1$ to computer 82 via lines 80 under control of control electronics 68a via lines 94. Again, control electronics 68a is partially under control of computer 82 via lines 92. Signal $74_2$ contains information concerning $\omega$ and $\phi$. Information on $\phi$ is derived, for example, by counting the number of standard pulses $74_2$ occurring after each synchronizing signal $74_1$ in computer 82.

The $\phi$ dependence of normalized torque $n(\phi)$ is coded into the computer memory, as is any functional system variation of $I_a$ with $\phi$, for example, via input lines 96. The computer is programmed to combine the independent angular-acceleration measurements to determine $N_A$, $N_B$, $I'$, and $N_C$ on command. These quantities are determined and the results are stored along with the relevant $\alpha_4$ measurement in memory section 88. The computer 82 is also programmed according to Equation 22 to provide a determination of $N_j$ in real time directly from the stored $\alpha_4$-type measurement, and from the sequence of $\alpha_{3f}$ and $\alpha_{3g}$ measurements made automatically for each cylinder at $\phi_o$ increments. For simplicity it is assumed that the angular velocity averaged over a cycle of the engine does not change over many cycles (steady-state operation). This constant averaged angular velocity, analogous to the previous $\omega_o$, 24, is referred to as the nominal angular velocity.

Finally, it should be noted that a sequence of suitably combined $\alpha_3$-type measurements may suffice for some under-the-hood monitoring systems, as follows. Referring again to the example of an eight-cylinder engine, a sequence of eight $\alpha_3$-type measurements, one on each cylinder, is made during a single engine-operating cycle at angular increments of $\phi_o$ near the peak torque position $N_j$ of each cylinder. The results are stored and averaged, and each of the individual measurements is compared to the average to give a measure of the performance of each cylinder relative to the average performance of all cylinders. The procedure depends on the load not changing measurably over one operating cycle and can be repeated for each cycle.

The various specific examples cited in the above discussion illustrate the novelty, generality, and utility of the method described herein. These examples serve to highlight the vast capabilities of the method and are not intended to be restrictive.

Throughout the drawings the symbol ⊕ represents a manually adjusted input of known or predetermined values. An arrow indicates a signal path and no arrow on the line means a control circuit. A sequence of three dots (. . .) in the drawings indicates a part of an array of elements, or lines, or inputs of which only the first and last are explicitly shown.

I claim:

1. A method for determining the contribution to the torque of a rotating system by any subsystem of said system without the necessity of appreciable perturbation of the operation of said system, wherein the inertial properties of said system are known, and wherein the particular relation for said subsystem torque is known in terms of both said system torque and other subsystem torques and involves a total of M—M being a number greater than 2—independent subsystem torques acting collectively on said system, said method comprising:

M independent torque determinations at a particular angular velocity wherein each said torque determination is established under operating conditions of said system specified to insure independence of said M torque determinations, combining said torque determinations according to said particular known relation so as to isolate said subsystem-torque contribution to said system torque from the contribution of other subsystem torques, and making the established torque available for further use, each of said M torque determinations comprising, a measurement by a controlled means of angular acceleration of a rotating element of said system, using said measurement of angular acceleration to obtain torque from the known inertial properties of said system, and averaging as many measurements as may be required to establish said torque to specified accuracy.

2. A method for determining the contribution to the torque of a rotating system having a rotating element by any subsystem of said system without the necessity of appreciable perturbation of the operation of said system, wherein the inertial properties of said system and the functional dependence of said inertial properties on measurable system parameters are known, wherein the particular relation for said subsystem torque is known in terms of both said system torque and other subsystem torques and involves a total of M — M being a number greater than 2 — independent subsystem torques acting collectively on said system, wherein said M subsystem torques have known normalized-torque profiles as a function of measurable system parameters, and wherein the functional dependence of said inertial properties on system parameters and the dependence of said profiles on system parameters involve a total of S — S being a positive number — system parameters, said method comprising:

M independent torque determinations wherein each said torque determination is established under system operating conditions and with said S system parameters both specified to insure independence of said M torque determinations, combining said torque determinations according to said particular known relation so as to isolate said subsystem-torque contribution to said system torque from the contribution of other subsystem torques, and making the subsystem torque to be determined available for further use;

each of said M torque determinations comprising, simultaneous measurements by controlled means of angular acceleration of said rotating element and of each of said S particular system parameters, using said simultaneous measurements to obtain a torque value at said S specified parameters from said known inertial properties and from said M normalized-torque profiles, and averaging as many said torque values as may be required to establish said torque to specified accuracy.

3. A method for determining the contribution to the torque of a rotating system by any subsystem of said system according to the method of claim 2 wherein the functional dependence of said inertial properties and of said M normalized subsystem torque profiles on measurable system parameters other than said S system parameters is unknown, said method comprising the method of claim 2, and maintaining said other system parameters constant over said M independent torque determinations so as to eliminate said unknown functional dependence.

4. A method for determining to a specified accuracy the torque profile of a subsystem of a rotating system having a rotating element over the operating range of S — S being a positive number — measurable system parameters involved in said torque profile without the necessity of appreciable perturbation of the operation of said system, wherein the inertial properties of said system and the functional dependence of said inertial properties on said S parameters are known, wherein the particular relation for said system torque is known in terms of all other subsystem torques acting collectively on said system, wherein the torque profiles for all other said subsystem torques are known as a function of said S parameters, and wherein a non-zero value of said subsystem torque is known for a particular value of said S parameters, said method comprising:

L independent torque determinations — L being a number greater than 2 — covering the operating range of said S parameters wherein each said torque determination is established at a different specified value of said S parameters and wherein L is specified so as to cover said operating range in sufficient detail to realize specified accuracy for said subsystem torque profile, combining said L torque determinations and said known value for said subsystem torque according to said particular known relation so as to isolate and establish said subsystem torque profile to be determined, and making this result available for further use;

each of said L torque determinations comprising, simultaneous measurements by a controlled means of angular acceleration of said rotating element and of each of said S particular system parameters, using said simultaneous measurements to obtain a torque value at said S specified parameters from said known inertial properties and from said known subsystem torque profiles, and averaging as many aaid torque values as may be required to establish said torque to specified accuracy.

5. A method for determining the torque profile of a subsystem of a rotating system according to the method of claim 4 wherein the functional dependence of said inertial properties and of said other subsystem torque profiles on measurable system parameters other than said S system parameters is unknown, said method comprising the method of claim 4, and holding said other system parameters constant over said L independent torque determinations so as to eliminate said unknown functional dependence.

6. A method for determining the contribution to the torque of a rotating system by any subsystem of said system wherein appreciable perturbation of the operation of said system is necessary, wherein the inertial properties of said system are known, and wherein the particular relation for said subsystem torque is known in terms of both said system torque and other subsystem torques and involves a total of M—M being a number greater than 2—independent subsystem torques acting collectively on said system, said method comprising:

M independent torque determinations at a particular angular velocity wherein each said torque determination is established under operating conditions of said system specified to insure independence of said M torque determinations, combining said torque determinations according to said particular known relation so as to isolate said subsystemtorque contribution to said system torque from the contribution of other subsystem torques, and making the established torque available for further use;

each of said M torque determinations comprising,
 a measurement by a controlled means of angular acceleration of a rotating element of said system,
 using said measurement of angular acceleration to obtain torque from the known inertial properties of said system,
 and averaging as many measurements as may be required to establish said torque to specified accuracy.

7. A method for determining the contribution to the torque of a rotating system having a rotating element by any subsystem of said system wherein appreciable perturbation of the operation of said system is necessary, wherein the inertial properties of said system and the functional dependence of said inertial properties on measurable system parameters are known, wherein the particular relation for said subsystem torque is known in terms of both said system torque and other subsystem torques and involves a total of M — M being a number greater than 2 — independent subsystem torques acting collectively on said system, wherein said M subsystem torques have known normalized-torque profiles as a function of measurable system parameters, and wherein the functional dependence of said inertial properties on system parameters and the dependence of said profiles on system parameters involve a total of S — S being a positive number — system parameters, said method comprising:

M independent torque determinations wherein each said torque determination is established under system operating conditions and with said S system parameters both specified to insure independence of said M torque determinations, combining said torque determinations according to said particular known relation so as to isolate said subsystemtorque contribution to said system torque from the contribution of other subsystem torques, and making the subsystem torque to be determined available for further use;

each of said M torque determinations comprising,
 simultaneous measurements by controlled means of angular acceleration of said rotating elements and of each of said S particular system parameters,
 using said simultaneous measurements to obtain a torque value at said S specified system parameters from said known inertial properties and from said M normalized-torque profiles,
 and averaging as many said torque values as may be required to establish said torque to specified accuracy.

8. A method for determining the contribution to the torque of a rotating system by any subsystem of said system according to the method of claim 7 wherein the functional dependence of said inertial properties and of said M normalized subsystem torque profiles on measurable system parameters other than said S system parameters is unknown, said method comprising the method of claim 7, and holding said other system parameters constant over said M independent torque determinations so as to eliminate said unknown functional dependence.

9. A method for determining to a specified accuracy the torque profile of a subsystem of a rotating system having a rotating element over the operating range of S — S being a positive number — measurable system parameters involved in said torque profile wherein appreciable perturbation of the operation of said system is necessary, wherein the inertial properties of said system and the functional dependence of said inertial properties on said S parameters are known, wherein the particular relation for said system torque is known in terms of all other subsystem torques acting collectively on said system, wherein the torque profiles for all other said subsystem torques are known as a function of said S parameters, and wherein a non-zero value of said subsystem torque is known for a particular value of said S parameters, said method comprising:

L independent torque determinations — L being a number greater than 2 — covering the operating range of said S parameters wherein each said torque determination is established at a different specified value of said S parameters and wherein L is specified so as to cover said operating range in sufficient detail to realize specified accuracy for said subsystem torque profile, combining said L torque determinations and said known value for said subsystem torque according to said particular known relation so as to isolate and establish said subsystem torque profile to be determined, and making this result available for further use;

each of said L torque determinations comprising,
 simultaneous measurements by a controlled means of angular acceleration of said rotating element and of each of said S particular system parameters,
 using said simultaneous measurements to obtain a torque value at said S specified system parameters from said known inertial properties and from said known subsystem torque profiles,
 and averaging as many said torque values as may be required to establish said torque to specified accuracy.

10. A method for determining the torque profile of a subsystem of a rotating system according to the method of claim 9 wherein the functional dependence of said inertial properties and of said other subsystem torque profiles on measurable system parameters other than said S system parameters is unknown, said method comprising the method of claim 9, and maintaining said other system parameters constant over said L independent torque determinations so as to eliminate said unknown functional dependence.

* * * * *